US012736438B2

(12) United States Patent
Large et al.

(10) Patent No.: US 12,736,438 B2
(45) Date of Patent: Sep. 15, 2026

(54) APPARATUS AND METHODS FOR MONITORING OPTICAL FIBER SYSTEM INTEGRITY

(71) Applicant: OneSubsea IP UK Limited, London (GB)

(72) Inventors: Robert Large, Houston, TX (US); Mahesh Shenoy, Houston, TX (US); Ronald James Spencer, Houston, TX (US); Jonathan Yarnold, Houston, TX (US)

(73) Assignee: OneSubsea IP UK Limited, London (GB)

( * ) Notice: Subject to any disclaimer, the term of this patent is extended or adjusted under 35 U.S.C. 154(b) by 185 days.

(21) Appl. No.: 18/780,127

(22) Filed: Jul. 22, 2024

(65) Prior Publication Data

US 2026/0022990 A1 Jan. 22, 2026

(51) Int. Cl.

| | |
|---|---|
| ***G01M 11/00*** | (2006.01) |
| ***E21B 41/00*** | (2006.01) |
| ***E21B 47/135*** | (2012.01) |

(52) U.S. Cl.

CPC ..... *G01M 11/3109* (2013.01); *E21B 41/0007* (2013.01); *E21B 47/135* (2020.05)

(58) Field of Classification Search

CPC ............ G01M 11/3109; E21B 41/0007; E21B 47/135

See application file for complete search history.

(56) References Cited

U.S. PATENT DOCUMENTS

| | | | | |
|---|---|---|---|---|
| 6,951,114 | B2 | 10/2005 | Grisham | |
| 2012/0176250 | A1 | 7/2012 | Duncan | |
| 2012/0273269 | A1 | 11/2012 | Rinzler | |
| 2024/0142422 | A1* | 5/2024 | Wilson | G01N 21/01 |

FOREIGN PATENT DOCUMENTS

| | | | | |
|---|---|---|---|---|
| CN | 116733448 A | | 9/2023 | |
| WO | WO-2004070167 A1 | * | 8/2004 | E21B 47/135 |

* cited by examiner

*Primary Examiner* — Hwa Andrew Lee

(74) *Attorney, Agent, or Firm* — Kyle R. Miiller

(57) ABSTRACT

A monitor for optical fibers includes a housing configured for use in a subsea environment, a light source, an optical sensor, and a controller coupled to the light source and to the optical sensor. In some embodiments, the monitor further includes a power source. In some embodiments, the monitor further includes a transceiver. In some embodiments, the monitor is coupled to an optical fiber system being run into a subsea well. The monitor tests the integrity of the optical fiber system during the running of the optical fiber system while the monitor is subsea. In some embodiments, the monitor is coupled to a subsea tree, and tests the integrity of the optical fiber system after running the optical fiber system into the well. In some embodiments, the monitor sends a signal to indicate the condition of the optical fiber system while the monitor is subsea.

5 Claims, 3 Drawing Sheets

200

RECEIVING AN OPTICAL SIGNAL AT A SUBSEA-LOCATED MONITOR FROM AN OPTICAL FIBER SYSTEM COUPLED TO A TUBULAR STRING WHILE THE TUBULAR STRING IS BEING RUN INTO A SUBSEA WELL — 202

DETERMINING A CONDITION OF THE OPTICAL FIBER SYSTEM USING THE MONITOR — 204

SENDING INFORMATION RELATING TO THE OPTICAL FIBER SYSTEM FROM THE MONITOR — 206

APPARATUS AND METHODS FOR MONITORING OPTICAL FIBER SYSTEM INTEGRITY

BACKGROUND

Some wells, for example wells used in the production of hydrocarbons, include optical fiber systems to provide downhole measurement of one or more parameters such as temperature, pressure, fluid flowrate, or the like. An optical fiber system may include optical connections between multiple fiber optic lines or optical connections between a fiber optic line and other equipment, such as a transducer of a sensor system. Each optical connection is a potential location of optical signal deterioration. A typical optical fiber system includes a fiber optic line attached to the exterior of a tubing string. While running the tubing string with an attached fiber optic line into a well, the fiber optic line may become damaged, creating a further potential location of optical signal deterioration. Operations on subsea wells are particularly complex and expensive, and the integrity of an optical fiber system in a subsea well may be critical to the successful operation of the subsea well. The identification of a problem with an optical fiber system while running the optical fiber system into a subsea well can enable operators to initiate remedial action before completing the running operation.

There is a need for systems, apparatus, and methods to provide monitoring of an optical fiber system while the optical fiber system is being installed in a subsea well.

SUMMARY

Aspects of the present disclosure provide systems, apparatus, and methods for monitoring an optical fiber system. In one aspect, a monitor for optical fibers includes a housing configured for use in a subsea environment. The housing contains a light source, an optical sensor, and a controller coupled to the light source and to the optical sensor. The monitor further includes a power source.

In another aspect, a method includes receiving an optical signal at a subsea-located monitor from an optical fiber system coupled to a tubular string while the tubular string is being run into a subsea well. The method further includes determining a condition of the optical fiber system using the monitor, and sending information relating to the optical fiber system from the monitor.

In another aspect, a method includes receiving an optical signal at a subsea-located monitor from an optical fiber system in a subsea well. The method further includes determining a condition of the optical fiber system using the monitor, and sending information relating to the optical fiber system from the monitor.

The following description and the appended figures set forth certain features for purposes of illustration.

BRIEF DESCRIPTION OF DRAWINGS

The appended figures illustrate only exemplary embodiments and are therefore not to be considered limiting of the scope of the disclosure, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Aspects of the present disclosure provide systems, apparatus, and methods for monitoring an optical fiber system while the optical fiber system is being installed in a well, such as a subsea well.

Figure 1:
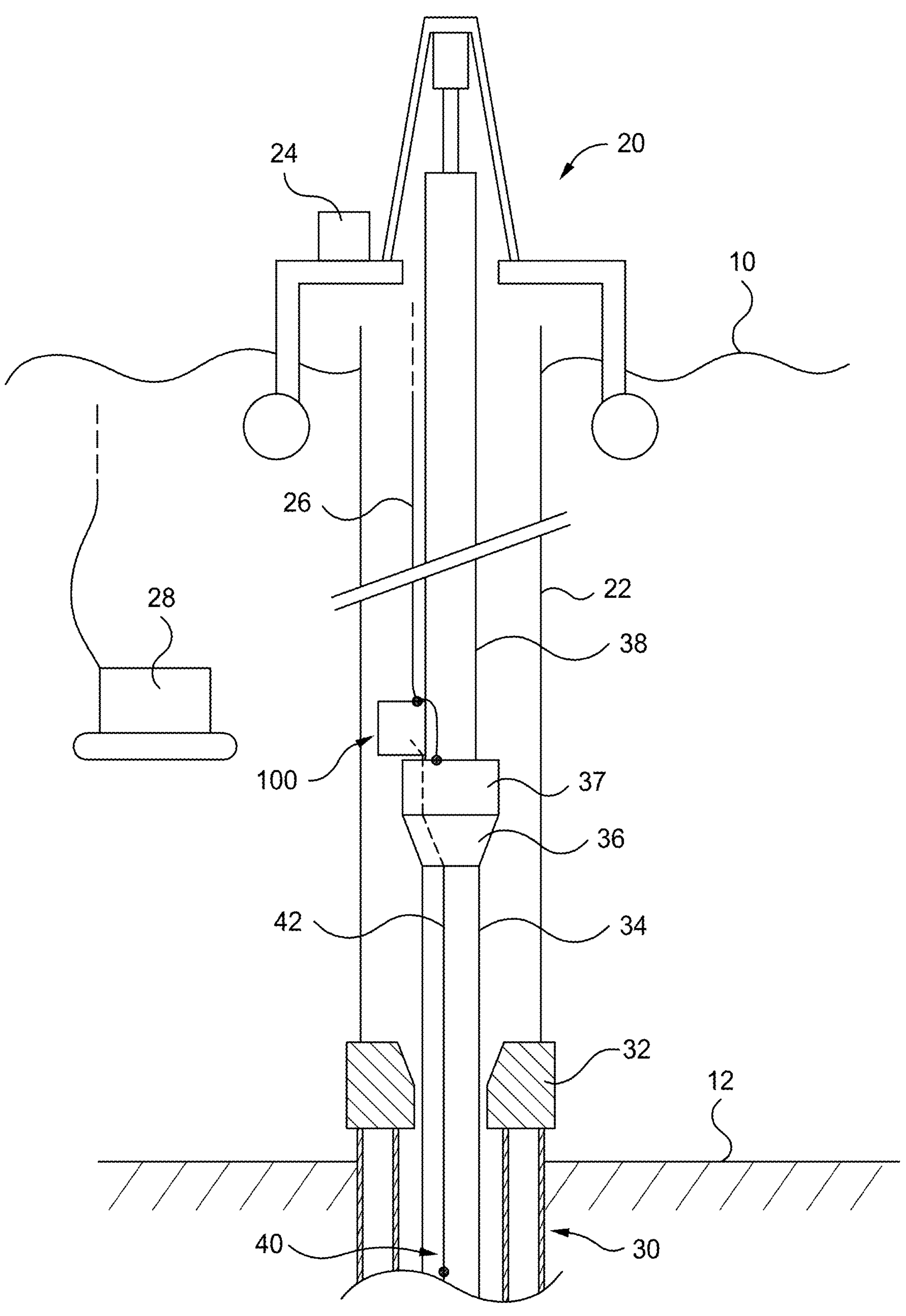
FIG. 1 schematically illustrates an operation at a subsea well in which a monitor is used to assess the integrity of an optical fiber system attached to a tubing string being run into the well.

FIG. 1 schematically illustrates an operation at a subsea well 30. The well 30 penetrates a seabed 12 and includes a wellhead 32. A riser 22 extends from the wellhead 32 to a drilling rig 20. A tubing string 34 is shown being run into the well 30 through the riser 22. The tubing string 34 is suspended from a tubing hanger 36 that is configured to engage the wellhead 32. The tubing hanger 36 is coupled to a running tool 37 that is coupled to a landing string 38 suspended from the drilling rig 20.

A fiber optic line 42 is coupled to the tubing string 34. The fiber optic line 42 forms at least part of an optical fiber system 40 that is being deployed in the well 30 with the tubing string 34. The fiber optic line 42 extends through the tubing hanger 36 and the running tool 37 to a monitor 100. In some embodiments, the monitor 100 is coupled to the running tool 37. In some embodiments, the monitor 100 is coupled to the landing string 38 at the running tool 37. The monitor 100 performs one or more checks on the optical fiber system 40 while the tubing string 34 is being run into the well 30. The monitor 100 performs one or more checks on the optical fiber system 40 while the monitor 100 is below the surface of the sea 10.

In some embodiments, the monitor 100 communicates with a system controller 24, such as a controller at a control room at the drilling rig 20. In some embodiments, the communication is one-way only from the monitor 100 to the system controller 24. In some embodiments, the communication is one-way only from the system controller 24 to the monitor 100. In some embodiments, the communication is two-way between the monitor 100 and the system controller 24. In an example, the monitor 100 receives commands from the system controller 24, and sends information, such as data, to the system controller 24, as described below.

In some embodiments, an umbilical 26 is deployed in the riser 22. The umbilical 26 may be coupled to the running tool 37. The umbilical 26 may be coupled to the monitor 100. In an example, the umbilical 26 provides power to the monitor 100. In a further example, the umbilical 26 facilitates telemetry between the monitor 100 and the system controller 24. In some embodiments, the monitor 100 communicates with the system controller 24 via electronic telemetry through the umbilical 26. In some embodiments, the monitor 100 communicates with the system controller 24 via optical telemetry through the umbilical 26. In some embodiments, the umbilical 26 is omitted.

In some embodiments, the monitor 100 communicates with the system controller 24 via acoustic telemetry through the fluid in the riser. In some embodiments, the monitor 100 communicates with the system controller 24 via acoustic telemetry through the landing string 38. In some embodiments, the monitor 100 communicates with the system controller 24 via electronic telemetry through a wire in the landing string 38. In some embodiments, the monitor 100 communicates with the system controller 24 via optical telemetry through a fiber optic line in the landing string 38.

In some embodiments, a remotely-operated vehicle (commonly referred to as an "ROV") 28 is operated in the sea while the monitor 100 is deployed. In an example, the monitor 100 communicates with the ROV 28, such as via acoustic telemetry. The ROV 28 relays the communications between the monitor 100 and the system controller 24.

After the tubing hanger 36 is set in the wellhead 32, the landing string 38 and the running tool 37 are disconnected from the tubing string 34. The landing string 38 and the running tool 37 are retrieved to a surface location (such as the drilling rig 20). In some embodiments, the monitor 100 is retrieved with the landing string 38 and the running tool 37 to the surface location. As described below, in some embodiments, data stored in a memory of the monitor 100 is downloaded after retrieval of the monitor 100.

Figure 2:
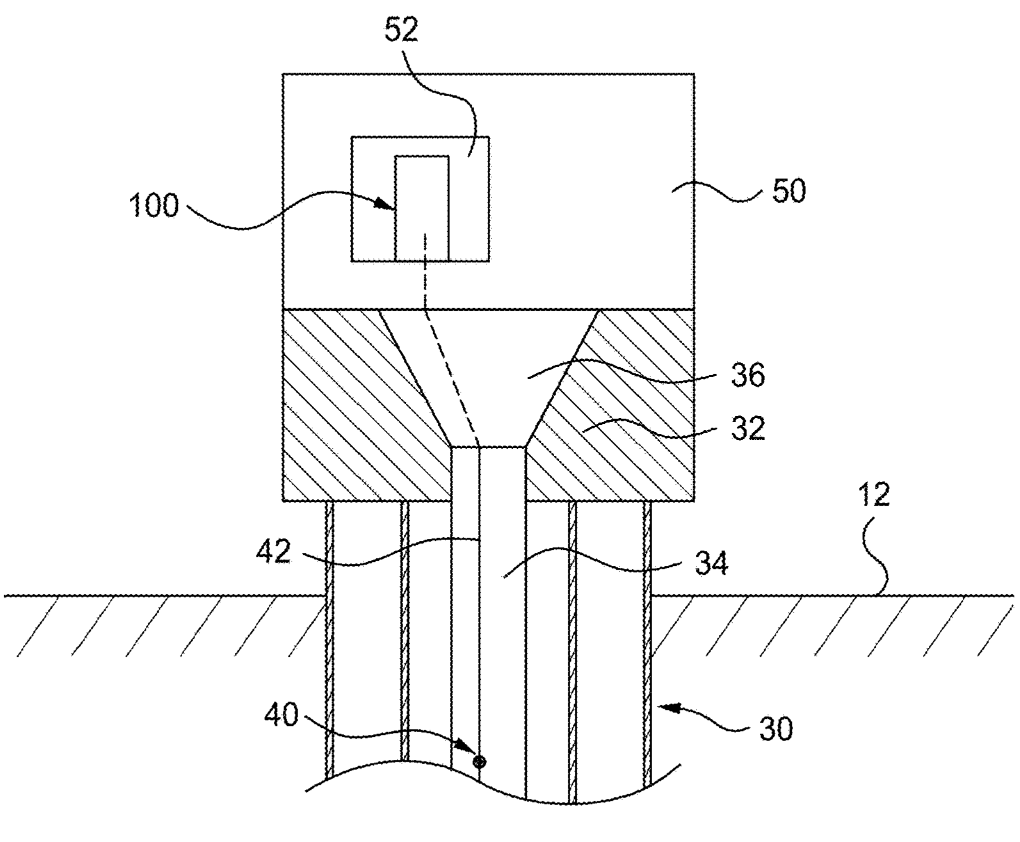
FIG. 2 schematically illustrates an operation at a subsea well in which a monitor is coupled to a subsea tree and is used to assess the integrity of the optical fiber system depicted in FIG. 1.

FIG. 2 schematically illustrates a subsea tree 50 coupled to the wellhead 32. In some embodiments, the subsea tree 50 is what is known as a "horizontal tree," and is coupled to the wellhead 32 before running the tubing string 34, and the tubing string 34 is run through the subsea tree 50. In other embodiments, the subsea tree 50 is what is known as a "vertical tree," and is coupled to the wellhead 32 after the landing string 38 and the running tool 37 are retrieved to a surface location.

The monitor 100 (which may be a second monitor 100) is coupled to the subsea tree 50. In some embodiments, the monitor 100 is coupled to a control pod 52 of the subsea tree 50. In some embodiments, the monitor 100 is on the ROV 28, and is coupled to the subsea tree 50 via an interface tool of the ROV 28. The monitor 100 is coupled to the fiber optic line 42 that is coupled to the tubing string 34. In an example, the monitor 100 is coupled to the fiber optic line 42 via a wet mate connection at the tubing hanger 36.

In some embodiments, the subsea tree 50 is coupled to an umbilical (such as umbilical 26, FIG. 1). The umbilical may be coupled to the control pod 52. The umbilical may be coupled to the monitor 100. In an example, the umbilical provides power to the monitor 100. In a further example, the umbilical 26 facilitates telemetry between the monitor 100 and the system controller 24. In some embodiments, the monitor 100 communicates with the system controller 24 via electronic telemetry through the umbilical. In some embodiments, the monitor 100 communicates with the system controller 24 via electromagnetic telemetry through the umbilical. In some embodiments, the monitor 100 communicates with the system controller 24 via optical telemetry through the umbilical 26. In some embodiments, the umbilical is omitted.

In some embodiments, the monitor 100 communicates with the system controller 24 via acoustic telemetry through the sea 10. In some embodiments, the ROV 28 is operated in the sea 10, and the monitor 100 communicates with the ROV 28, such as via acoustic telemetry. The ROV 28 relays the communications between the monitor 100 and the system controller 24.

In some embodiments, assessing the condition of the optical fiber system 40 is performed by a first monitor 100 and then by a second monitor 100. In an example, the first monitor 100 is coupled to the landing string 38 and/or the running tool 37 (such as described above with respect to FIG. 1), and the second monitor 100 is coupled to the subsea tree 50 (such as described above with respect to FIG. 2). The first monitor 100 is used to assess the condition of the optical fiber system 40 while the tubing string 34 is being run into the well 30. The second monitor 100 is used to assess the condition of the optical fiber system 40 after landing the tubing hanger 36 in the wellhead 32, and before coupling production infrastructure (such as one or more flowlines or a well control system) to the subsea tree 50. In such embodiments, the condition of the optical fiber system 40 may be assessed during and after installation of the optical fiber system 40, but before commissioning of the well 30.

Figure 3:
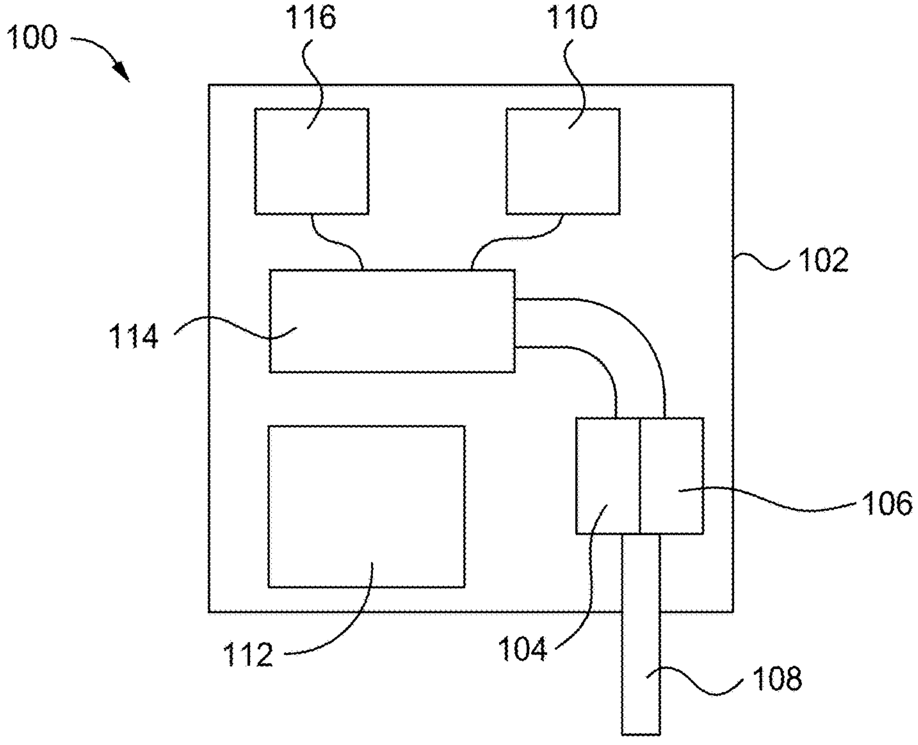
FIG. 3 schematically illustrates an exemplary configuration of the monitors of FIG. 1 or 2.

FIG. 3 schematically illustrates an exemplary configuration of the monitor 100. The monitor 100 includes a housing 102 that is configured for use in a subsea environment. In an example, the housing 102 has a shape and thickness configured to withstand external pressure and is sealed against water ingress. In some embodiments, the housing 102 contains a light source 104, such as a light-emitting diode or a laser, that is used to test the fiber optic line 42. In some embodiments, the housing 102 contains an optical sensor 106 that is used to detect light returning to the monitor 100 through the fiber optic line 42. In operation, the light source 104 and the optical sensor 106 are optically coupled to the fiber optic line 42 via a connector 108, such as a wet mate connector. In some embodiments, at least one of the light source 104 or the optical sensor 106 is external to the housing 102. In an example, at least one of the light source 104 or the optical sensor 106 is coupled to a tool on the ROV 28 that is configured to plug into the housing 102. In another example, the light source 104 is provided as part of the optical fiber system 40 and is coupled to the tubing string 34. In such an example, the light source 104 may be powered by a downhole power source, such as a battery.

In some embodiments, the housing 102 contains a transceiver 110 configured to facilitate communications between the monitor 100 and the system controller 24. In an example, the transceiver 110 facilitates acoustic telemetry, such as described above. In another example, the transceiver 110 facilitates electronic telemetry, such as described above. In another example, the transceiver 110 facilitates optical telemetry, such as described above. In some embodiments, the transceiver 110 is external to the housing 102. In an example, the transceiver 110 is part of a communications system separate from the monitor 100, and the monitor 100 is operably coupled to the communications system.

In some embodiments, the housing 102 contains a power source 112, such as a battery. In some embodiments, the power source 112 is external to the housing 102. In an example, the power source 112 is plugged into the housing 102.

In some embodiments, the housing 102 contains a controller 114. The controller 114 includes a central processing unit (CPU), a local memory containing instructions, and support circuits for the CPU. The local memory, or non-transitory computer readable medium, is one or more of a readily available local memory such as random access memory (RAM), read only memory (ROM), hard disk, flash drive, solid state drive, or any other form of digital storage, local or remote. The support circuits are coupled to the CPU for supporting the CPU. The support circuits include cache, power supplies, clock circuits, input/output circuitry and subsystems, and the like. Operations and operating parameters are stored in the local memory as a software routine that is executed or invoked to configure the controller 114 into a specific purpose controller to control the operations of the monitor 100. The controller 114 is configured to conduct one or more of the operations described herein. The instructions stored on the local memory, when executed, cause one or more of the operations described herein to be conducted. In some embodiments, the controller 114 is external to the housing 102. In an example, the controller 114 is plugged into the housing 102.

In some embodiments, the housing 102 contains a memory 116, such as a RAM, hard disk, flash drive, solid state drive, or any other form of digital storage. The memory 116 is configured to store data collected by the monitor 100 during operation of the monitor 100. In some embodiments, data stored in the memory 116 can be downloaded after retrieval of the monitor 100 from a subsea location to a surface location (such as the drilling rig 20). In some embodiments, the memory 116 is external to the housing 102. In an example, the memory 116 is plugged into the housing 102.

During operation of the monitor 100, light pulses from the light source 104 are transmitted through the fiber optic line 42 (FIGS. 1, 2). In some embodiments, the emission of the light pulses is triggered by the controller 114. The optical detector 106 senses light that returns to the monitor 100 through the fiber optic line 42 by (for example) backscattering or reflection. The controller 114 receives a data signal from the optical sensor 106 corresponding to a measurement made by the optical sensor 106. In some embodiments, the controller 114 determines from the data signal a condition of the optical fiber system 40 of which the fiber optic line 42 is a part. The condition indicates the integrity of the optical fiber system 40 and may include an attenuation coefficient or a quantification of signal loss of the fiber optic line 42. In an example, the controller 114 determines a distance from the optical sensor 106 of a location along the fiber optic line 42 at which a feature of the optical fiber system 40 causes an anomalous amount of backscattering or reflection. For instance, the feature may be a connector coupled to the fiber optic line 42, a splice in the fiber optic line 42, or damage to the fiber optic line 42. In some embodiments, the controller 114 causes the monitor 100 to perform the operations to assess the condition of the optical fiber system 40 by optical time domain reflectometry.

In some embodiments, the controller 114 determines a synopsis of the integrity of the optical fiber system 40 from the raw data obtained by the optical sensor 106. In some embodiments, the controller 114 determines a synopsis of the integrity of the optical fiber system 40 from the attenuation coefficient or quantification of signal loss.

In an example, if the attenuation coefficient is below a first threshold value, the synopsis includes that the integrity of the optical fiber system 40 is good. Additionally, if the attenuation coefficient is above the first threshold value but below a second threshold value, the synopsis includes that the integrity of the optical fiber system 40 is medium. Furthermore, if the attenuation coefficient is above the second threshold value, the synopsis includes that the integrity of the optical fiber system 40 is poor.

In another example, if the quantified signal loss at one or more locations along the fiber optic line 42 is below a third threshold value, the synopsis includes that the integrity of the optical fiber system 40 is good. Additionally, if the quantified signal loss at one or more locations along the fiber optic line 42 is above the third threshold value but below a fourth threshold value, the synopsis includes that the integrity of the optical fiber system 40 is medium (such as at the one or more locations). Furthermore, if the quantified signal loss at one or more locations along the fiber optic line 42 is above the fourth threshold value, the synopsis includes that the integrity of the optical fiber system 40 is poor (such as at the one or more locations).

In some embodiments, the synopsis includes that the integrity of the optical fiber system 40 is good at one or more locations along the fiber optic line 42, but medium or poor at one or more other locations along the fiber optic line 42. In some embodiments, the synopsis includes that the integrity of the optical fiber system 40 is medium at one or more locations along the fiber optic line 42, but poor at one or more other locations along the fiber optic line 42.

In some embodiments, the raw data obtained by the optical sensor 106 is stored in the memory 116. In some embodiments, the determination by the controller 114 of an attenuation coefficient or a quantification of signal loss is stored in the memory 116. In some embodiments, the determination by the controller 114 of a synopsis of the integrity of the optical fiber system 40 is stored in the memory 116.

In some embodiments, the controller 114 causes the monitor 100 to send a data signal (such as to the system controller 24 via the transceiver 110) corresponding to the condition of the optical fiber system 40. In an example, the data signal includes a subset of the raw data. In this example, the monitor 100 may send the data signal in response to the controller 114 receiving a specific request (such as via the system controller 24) for the raw data pertaining to one or more locations (or a range of locations) along the fiber optic line 42. In another example, the data signal sent by the monitor 100 includes the attenuation coefficient or the quantification of signal loss of the optical fiber system 40. In another example, the data signal sent by the monitor 100 includes the synopsis of the condition or integrity of the optical fiber system 40.

Figure 4:
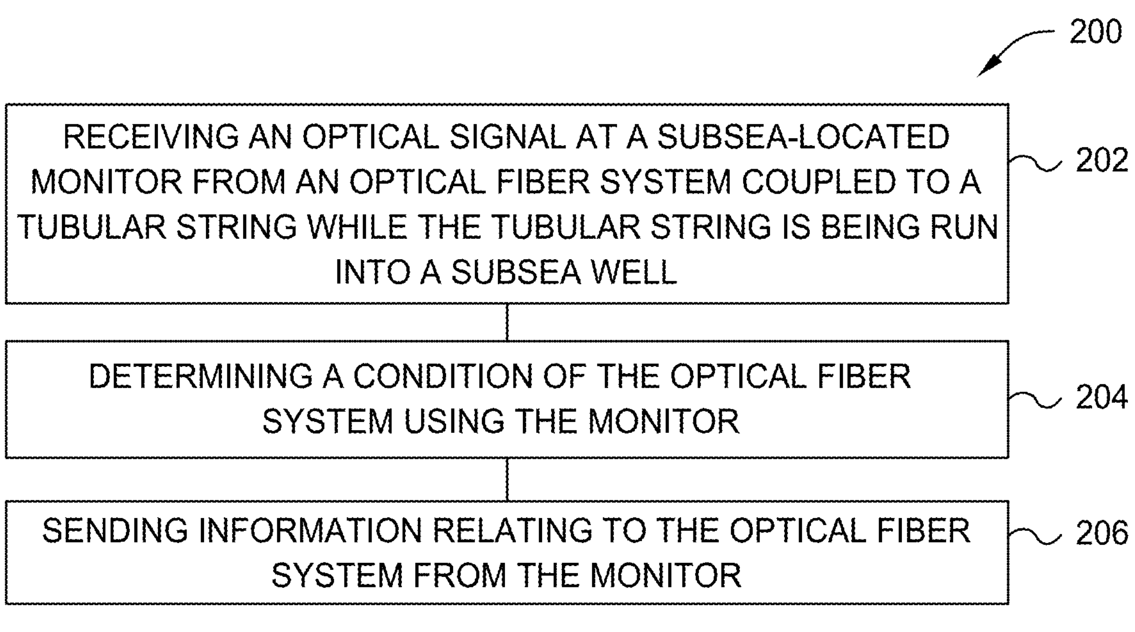
FIG. 4 is a flowchart of an exemplary method of monitoring an optical fiber system.

FIG. 4 is a flowchart of an exemplary method 200 of monitoring an optical fiber system, such as optical fiber system 40. Operation 202 includes receiving an optical signal at a subsea-located monitor (such as monitor 100) from an optical fiber system that is coupled to a tubular string (such as tubing string 34) while the tubular string is being run into a subsea well (such as well 30). In some embodiments, the optical signal is received by a sensor of the monitor, such as optical sensor 106.

In some embodiments, operation 202 includes sending an initial optical signal to the optical fiber system prior to receiving the optical signal at the monitor. In an example, the initial optical signal is sent from a light source at the monitor. In another example, the initial optical signal is sent from a light source at an ROV (such as ROV 28). In another example, the initial optical signal is sent from a light source that is part of the optical fiber system.

In some embodiments, the monitor is coupled to a landing string (such as landing string 38) that is being used to run the tubular string into the well. In some embodiments, the monitor is coupled to a running tool (such as running tool 37) of a tubing hanger (such as tubing hanger 36) that is coupled to the tubular string.

Operation 204 includes determining a condition of the optical fiber system using the monitor. In some embodiments, operation 204 is performed based on the optical signal received at operation 202. In some embodiments, operation 204 includes performing optical time domain reflectometry.

Operation 206 includes sending information relating to the optical fiber system from the monitor. In some embodiments, operation 206 includes sending the information while the monitor is subsea. In some embodiments, operation 206 includes transmitting the information via electrical telemetry, electromagnetic telemetry, acoustic telemetry, or optical telemetry. In some embodiments, the monitor sends the information to a system controller (such as system controller 24) located on a drilling rig (such as drilling rig 20).

In some embodiments, the information relating to the optical fiber system corresponds to the condition of the optical fiber system determined at operation 204. In some embodiments, the condition includes an attenuation coefficient or a quantification of signal loss of the optical fiber system. In some embodiments, the information relating to the optical fiber system includes data corresponding to the optical signal received at operation 202. In some embodiments, the information relating to the optical fiber system includes a subset of measurements made by an optical sensor of the monitor, such as described above. In some embodiments, the information relating to the optical fiber system includes a synopsis of the condition of the optical fiber system, such as described above. In some embodiments, the information relating to the optical fiber system is stored in a memory of the monitor, such as memory 116.

In some embodiments, operation 206 is omitted. In some embodiments, the method 200 includes downloading the information relating to the optical fiber system from the memory of the monitor. In some embodiments, the method 200 includes operation 206 followed by downloading the information relating to the optical fiber system from the memory of the monitor.

In some embodiments, the method 200 includes disconnecting a landing string (such as landing string 38) from the tubular string, and retrieving the landing string to a surface location (such as drilling rig 20). In some embodiments, the method 200 includes retrieving the monitor with the landing string. In some embodiments, the method 200 includes downloading the information relating to the condition of the optical fiber system from the memory of the monitor after retrieving the monitor.

Figure 5:
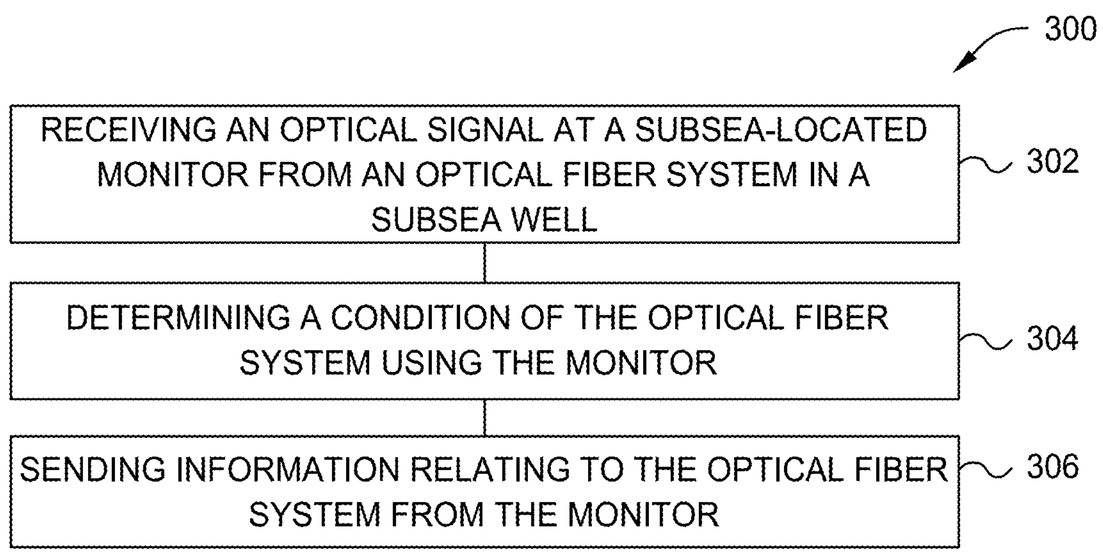
FIG. 5 is a flowchart of an exemplary method of monitoring an optical fiber system.

FIG. 5 is a flowchart of an exemplary method 300 of monitoring an optical fiber system, such as optical fiber system 40. Operation 302 includes receiving an optical signal at a subsea-located monitor (such as monitor 100) from an optical fiber system in a subsea well (such as well 30). In some embodiments, the optical signal is received by a sensor of the monitor, such as optical sensor 106.

In some embodiments, operation 302 includes sending an initial optical signal to the optical fiber system prior to receiving the optical signal at the monitor. In an example, the initial optical signal is sent from a light source at the monitor. In another example, the initial optical signal is sent from a light source at an ROV (such as ROV 28). In another example, the initial optical signal is sent from a light source that is part of the optical fiber system.

In some embodiments, the optical fiber system is coupled to a tubular string (such as tubing string 34) being run into the well. In an example, the monitor is coupled to a landing string (such as landing string 38) that is being used to run the tubular string into the well. In another example, the monitor is coupled to a running tool (such as running tool 37) of a tubing hanger (such as tubing hanger 36) that is coupled to the tubular string.

In some embodiments, the monitor is coupled to a subsea tree (such as subsea tree 50) of the subsea well. In some of such embodiments, the subsea tree is a horizontal tree. In others of such embodiments, the subsea tree is a vertical tree. In some embodiments, the monitor is coupled to a control pod of the subsea tree (such as control pod 52).

Operation 304 includes determining a condition of the optical fiber system using the monitor. In some embodiments, operation 304 is performed based on the optical signal received at operation 302. In some embodiments, operation 304 includes performing optical time domain reflectometry.

Operation 306 includes sending information relating to the optical fiber system from the monitor. In some embodiments, operation 306 includes sending the information while the monitor is subsea. In some embodiments, operation 306 includes transmitting the information via electrical telemetry, electromagnetic telemetry, acoustic telemetry, or optical telemetry. In some embodiments, the monitor sends the information to a system controller (such as system controller 24) located on a drilling rig (such as drilling rig 20).

In some embodiments, the information relating to the optical fiber system corresponds to the condition of the optical fiber system determined at operation 304. In some embodiments, the condition includes an attenuation coefficient or a quantification of signal loss of the optical fiber system. In some embodiments, the information relating to the optical fiber system includes data corresponding to the optical signal received at operation 302. In some embodiments, the information relating to the optical fiber system includes a subset of measurements made by an optical sensor of the monitor, such as described above. In some embodiments, the information relating to the optical fiber system includes a synopsis of the condition of the optical fiber system, such as described above. In some embodiments, the information relating to the optical fiber system is stored in a memory of the monitor, such as memory 116.

In some embodiments, operation 306 is omitted. In some embodiments, the method 300 includes downloading the information relating to the optical fiber system from the memory of the monitor. In some embodiments, the method 300 includes operation 306 followed by downloading the information relating to the optical fiber system from the memory of the monitor.

Method 200 and method 300 may include any system, apparatus, operation, or activity described herein.

Embodiments of the present disclosure provide systems, apparatus, and methods for monitoring an optical fiber system while the optical fiber system is being installed in a well, such as a subsea well. The monitoring may be performed even if the optical fiber system is being installed in a well without the use of an umbilical. Additionally, the monitoring is performed by a monitor located at or close to the tubing hanger while the monitor is subsea. Such a location enables the monitoring to be focused on the optical fiber system without being influenced by the condition of any fiber optic lines that extend between the tubing hanger and a drilling rig at the surface.

It is contemplated that any one or more elements or features of any one disclosed embodiment or example may be beneficially incorporated in any one or more other non-mutually exclusive embodiments or examples. While the foregoing is directed to embodiments of the present disclosure, other and further embodiments of the disclosure may be devised without departing from the basic scope thereof, and the scope thereof is determined by the claims that follow.

The following claims are not intended to be limited to the aspects shown herein, but are to be accorded the full scope consistent with the language of the claims. Within a claim, reference to an element in the singular is not intended to mean “one and only one” unless specifically so stated, but rather “one or more.” Unless specifically stated otherwise, the term “some” refers to one or more. No claim element is to be construed under the provisions of 35 U.S.C. § 112(f) unless the element is expressly recited using the phrase “means for.” All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A monitor for monitoring an optical fiber line coupled to a tubular string, the monitor comprising:

a housing configured for use in a subsea environment, the housing containing:

a light source configured to send an input optical signal into the optical fiber line;

an optical sensor configured to detect an output optical signal from the optical fiber line; and a controller coupled to the light source and to the optical sensor, wherein the controller operates to control the light source to send the input optical signal and to control the optical sensor to detect the output optical signal, wherein the controller comprises instructions that cause a plurality of operations to be conducted when the instructions are executed, the plurality of operations comprising:

receiving a first data signal from the optical sensor based on the output optical signal;

determining, from the first data signal, a condition of the optical fiber line;

generating a synopsis of the condition, wherein the synopsis comprises a classification of integrity of the optical fiber line as being one of at least three categories based on a comparison of an attenuation coefficient or a quantification of signal loss against one or more threshold values; and sending a second data signal comprising the synopsis; and a power source.

2. The monitor of claim 1, wherein the determining of the condition of the optical fiber line coupled to the monitor includes performing optical time domain reflectometry.

3. The monitor of claim 1, wherein the second data signal includes a subset of information contained in the first data signal.

4. The monitor of claim 1, wherein sending the second data signal includes transmitting the second data signal via electrical telemetry, electromagnetic telemetry, acoustic telemetry, or optical telemetry.

5. The monitor of claim 1, further comprising a memory configured to store information contained in the first data signal.

* * * * *